(No Model.)

T. RAYMOND.
CHIN CHECK FOR HORSES.

No. 524,669. Patented Aug. 14, 1894.

Witnesses,

Inventor,
Thomas Raymond
By Dewey & Co. attys

UNITED STATES PATENT OFFICE.

THOMAS RAYMOND, OF WALLA WALLA, WASHINGTON.

CHIN-CHECK FOR HORSES.

SPECIFICATION forming part of Letters Patent No. 524,669, dated August 14, 1894.

Application filed November 6, 1893. Serial No. 490,203. (No model.)

*To all whom it may concern:*

Be it known that I, THOMAS RAYMOND, a citizen of the United States, residing at Walla Walla, Walla Walla county, State of Washington, have invented an Improvement in Chin-Checks; and I hereby declare the following to be a full, clear, and exact description of the same.

My invention relates to the class of harness head checks, and particularly to that form of check which, on account of its application, is known as a "chin-check."

My invention consists in the novel construction and arrangement of the chin-strap, the nose-strap and the intervening side pieces forming levers by which the two straps are drawn tightly to place and form with the overdraw strap of the check, the proper rest for the horse's head, as I shall hereinafter fully describe.

The object of my invention is to provide a chin-check having a powerful and sufficient leverage to bind the chin and nose-straps to place, and which, at the same time, shall not interfere in any way with the driving bit.

Figure 1:
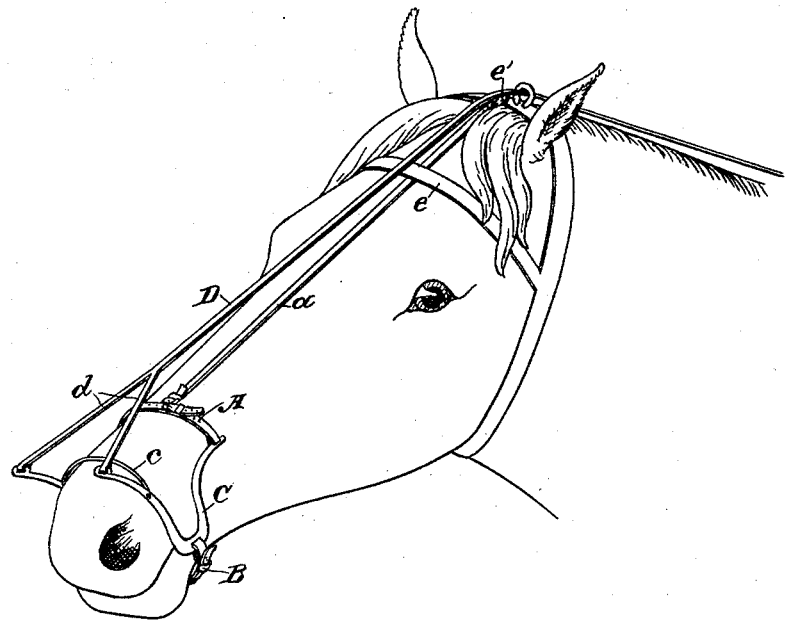
Figure 2:
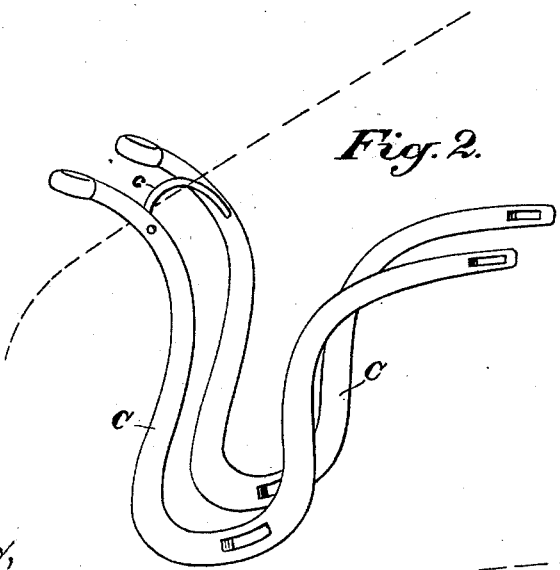

Referring to the accompanying drawings for a more complete explanation of my invention,—Figure 1 is a perspective view of the check, showing its application. Fig. 2 is a view of the side pieces C of the check, showing their shape.

The device is composed of the nose-strap A, the chin-strap B, and the intervening side pieces C forming the levers, said device, in connection with the strap D, forming the complete check.

The side pieces C are made of metal and have approximately a U-shape, with flaring or divergent extremities.

Between the rear extremity of each side piece extends the nose-strap A which is properly secured thereto, as by being buckled through slots in said extremities.

Between the bases of the side pieces extends the chin-strap B, being properly secured thereto, as by being buckled through slots in said bases.

If desired, a spreader bar *c* may extend between the forward arms of the side pieces C to hold them well apart.

The forks *d* of the overdraw strap D are properly secured in the forward extremities of the side pieces C, said strap thence continuing in its usual course to the water-hook of the saddle.

A holding strap *a* is secured to the nose-strap A, and thence extends upwardly under the brow band *e* of the bridle, and is secured in suitable manner to the crown piece *e'* of said bridle. This strap *a* is for the purpose of holding the nose-strap in place.

The application of the check is seen in Fig. 1 wherein is shown the nose-strap A extending across the upper portion of the nose of the horse, the chin-strap passing under his chin, while the side pieces C lie on each side of his nose, their forward arms being toward the extremity thereof. It will now be seen that the strain upon the overdraw strap D will cause the side pieces C to act as levers, their rear extremities bearing on the nose-strap A as a fulcrum whereby said nose-strap is tightened to place, and at the same time the chin-strap is raised up and tightened in its place. This leverage of the side pieces C is a powerful one, and so tightens the device in place that it will act as a complete rest for the horse's head, and by reason of its construction, it will not interfere in any manner with the ordinary driving bit or its connections.

Having thus described my invention, what I claim as new, and desire to secure by Letters Patent, is—

1. A chin check attachment comprising the U-shaped side pieces adapted to lie upon each side of the horse's nose in a substantially upright position, a strap secured to the bases of said side pieces and passing under the horse's chin, a strap secured to their rear upper extremities and passing over the horse's nose, and a check strap secured to the upper forward extremities of said side pieces, substantially as described.

2. A chin check attachment comprising the U-shaped side pieces adapted to lie upon each side of the horse's nose in a substantially upright position, a strap secured to the bases of said side pieces and passing under the horse's chin, a strap secured to their rear upper extremities and passing over the horse's nose, a check strap secured to the upper forward extremities of said side pieces, and a spreader bar to hold the side pieces separated, substantially as described.

3. A chin check attachment comprising the U shape bitless side pieces, the upper ends of the forward arms or members of which are provided with devices for connecting a check strap therewith, a spreader bar connecting the upper ends of the said forward members to cross the animal's nose, a nose strap connecting the upper ends of the rear members of said side pieces, and the chin strap connecting the lower ends or bends of said side pieces, substantially as herein described.

4. A chin check attachment consisting in the bitless U shape side pieces C, the upper ends of each of which diverge oppositely, the spreader c connecting the upper portions of the forward members of the side pieces to cross above the animal's nose, the chin strap connecting the lower ends or bends of the side pieces, the nose strap connecting the upper ends of the rear members of the side pieces, and the strap a extending from the nose strap to connect with crown piece, substantially as herein described.

5. A chin check attachment consisting in the parallel U shape bitless side pieces C, the arms of which at their upper ends project in opposite directions, and are provided at their extremities with strap receiving slots or openings, and the lower ends or bows of the said side pieces being also provided with strap slots or openings, and a spreader c connecting the forwardly projecting ends of the forward member, substantially as herein described.

In witness whereof I have hereunto set my hand.

THOMAS RAYMOND.

Witnesses:
S. H. NOURSE,
J. A. BAYLESS.